A. E. Cruttenden,
Poke.
No. 102,778.  Patented May 10, 1870.
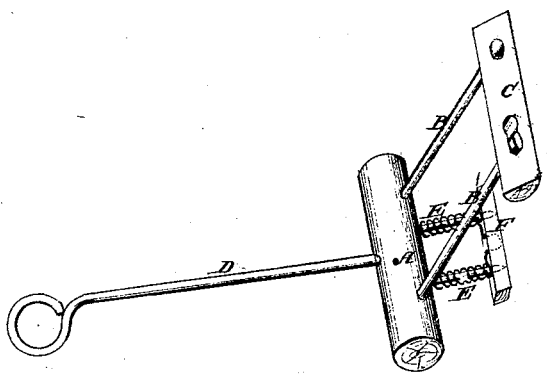
Witnesses:  Inventor:

United States Patent Office.

ALVAH E. CRUTTENDEN, OF CANASERAGA, NEW YORK.

Letters Patent No. 102,778, dated May 10, 1870.

IMPROVEMENT IN POKES.

The Schedule referred to in these Letters Patent and making part of the same.

*To all whom it may concern:*

Be it known that I, ALVAH E. CRUTTENDEN, of Canaseraga, in the county of Allegany and State of New York, have invented a new and improved Poke; and I do hereby declare that the following is a full, clear, and exact description thereof, which will enable others skilled in the art to make and use the same, reference being had to the accompanying drawings forming part of this specification, in which the figure is a perspective view of my improved poke.

This invention relates to pokes or devices employed to prevent animals from jumping over or pulling down fences, and consists in certain improved features of construction, which will be specified hereinafter.

A is the bar that goes below the animal's neck, and to which are securely and rigidly attached the lower ends of the bars or rods B, that pass up upon the sides of the animal's neck.

C is the upper cross-bar that rests upon the back of the animal's neck.

The upper end of one of the bars or rods B passes up through and is pivoted to the end of the bar C.

The upper end of the other rod or bar B, which is flattened or has a neck formed upon it near its upper end, passes through a slot in the other end of the said bar C.

The inner end of the said slot is made larger than the outer end, so that the upper end or head of the said rod or bar B may pass through the said larger end of the said slot, but cannot pass through the outer or smaller end.

The rods or bars B are made elastic, and are so arranged that their elasticity may hold the free end of the one rod pressed out into the outer or smaller end of the slot in the cross-bar C.

The yoke is placed upon and removed from the animal's neck by springing the free end of the rod or bar B inward, raising the slotted end of the cross-bar C, and swinging it around upon the upper end of the other bar B.

D is the tongue of the yoke, the upper end of which is securely and rigidly attached to the middle part of the lower bar A.

The lower or forward end of the tongue D is bent over, as shown in the figure, so that it cannot be passed between the rails or boards of a fence, to enable the animal to come close to it.

To the side of the bar A, next the animal's breast, are attached two spikes E, the outer or pointed ends of which enter the holes made through the short bar F.

Around the spikes E are coiled springs G, the outer ends of which are securely attached to the bar A, and the inner ends of which are securely attached to the short bar F, to hold it in place upon the points of the spikes E.

With this construction, should the animal press the forward end of the tongue D against a fence or other object, the bar F will be pressed against the animal's breast, which pressure will force the said bar F forward, compressing the springs G, and causing the spikes E to project through the bar F, and prick the animal's breast, thus preventing the animal from pushing with the poke.

Having thus described my invention,

I claim as new and desire to secure by Letters Patent—

1. The combination of bar C, having oblong slot near one end, and spring bars B B, with the body A, adjusted together to form a yoke readily detachable, as set forth.

2. The ringed tongue D, body A, spring-adjusting yoke B B C, and pricking device E E F, all combined and relatively constructed as set forth.

A. E. CRUTTENDEN.

Witnesses:
J. LEONARD,
S. J. LACKEY.